United States Patent
Airamo

(10) Patent No.: US 7,401,353 B2
(45) Date of Patent: Jul. 15, 2008

(54) DETECTING AND BLOCKING MALICIOUS CONNECTIONS

(75) Inventor: Joona Airamo, Espoo (FI)

(73) Assignee: Stonesoft Corporation (FI)

( * ) Notice: Subject to any disclaimer, the term of this patent is extended or adjusted under 35 U.S.C. 154(b) by 751 days.

(21) Appl. No.: 10/689,549

(22) Filed: Oct. 21, 2003

(65) Prior Publication Data

US 2004/0148524 A1 Jul. 29, 2004

(30) Foreign Application Priority Data

Jan. 23, 2003 (FI) .................................. 20030104

(51) Int. Cl.
- G06F 17/00 (2006.01)
- G06F 9/00 (2006.01)
- G06F 15/16 (2006.01)
- H04K 1/00 (2006.01)
- H04L 9/00 (2006.01)

(52) U.S. Cl. ............................................ 726/1; 726/22
(58) Field of Classification Search .................... 726/1, 726/22

See application file for complete search history.

(56) References Cited

U.S. PATENT DOCUMENTS

| 5,915,087 A | 6/1999 | Hammond et al. |
| 6,219,706 B1 | 4/2001 | Fan et al. |
| 6,510,154 B1 | 1/2003 | Mayes et al. |
| 2002/0013910 A1 | 1/2002 | Edery et al. |
| 2002/0138634 A1 | 9/2002 | Davis et al. |
| 2003/0084344 A1 * | 5/2003 | Tarquini et al. ............. 713/201 |
| 2003/0131116 A1 * | 7/2003 | Jain et al. .................... 709/230 |
| 2004/0054928 A1 * | 3/2004 | Hall ............................ 713/201 |
| 2004/0128545 A1 * | 7/2004 | Chakravarty ................ 713/201 |

FOREIGN PATENT DOCUMENTS

| EP | 1 081 918 A2 | 3/2001 |
| EP | 1 361 724 A | 11/2003 |
| WO | WO 02/21795 A2 | 3/2002 |

OTHER PUBLICATIONS

Klint, A. R., "The Personal Firewall, Technical Documentation," Internet Publication, Online!, XP-002278265, p. 1-13, ( Feb. 16, 2002).
Callisoft, "The Personal Firewall," Online!, XP-002278266 , p. 1-2, ( Feb. 16, 2002).

* cited by examiner

*Primary Examiner*—Matthew Heneghan
*Assistant Examiner*—Farid Homayounmehr
(74) *Attorney, Agent, or Firm*—Barnes & Thornburg LLP

(57) ABSTRACT

In a device having data communication capability, a security method dynamically detecting a control connection, which originates from the device, and detecting a negotiation of a related connection within the control connection. The negotiation comprises at least defining a port of the device for said related connection. The method further checks if relationship between said port of the device and the control connection fulfills predefined criteria, and conditionally blocks said related connection, if said port of the device does not fulfill said predefined criteria. The method can be used for suppressing a vulnerability related to applets.

11 Claims, 1 Drawing Sheet

DETECTING AND BLOCKING MALICIOUS CONNECTIONS

FIELD OF THE INVENTION

The present invention relates to information security and especially to securing a device having data communication capability.

BACKGROUND OF THE INVENTION

In data networks such as Internet, it is in practice mandatory to have information security measures in place in order to secure proprietary information and to defend against malicious intruders.

An applet is a little application. On the Web (WWW, World Wide Web), using Java, the object-oriented programming language, an applet is a small program that can be sent from a Web server along with a Web page to a user. Java applets can perform interactive animations, immediate calculations, or other simple tasks without having to send a user request back to the server. When a browser requests a Web page with applets, the applets are sent automatically and can be executed as soon as the page arrives in the browser. If the applet is allowed unlimited access to memory and system resources, it can do harm in the hands of someone with malicious intent. For the sake of security, applets are run in "a sandbox", where the applet has only limited access to system resources. The sandbox creates an environment in which there are strict limitations on what system resources the applet can request or access. Sandboxes are used when executable code comes from unknown or untrusted sources and allow the user to run untrusted code safely. However, not all functionality of an applet can be denied even in sandbox. For example, an applet may need to open new outward connections towards the server they originated from.

FTP is an example of commonly used transfer protocols, which consist of more than one separate connection. In such protocols, a first connection is opened and then at least one other connection is opened on the basis of information obtained from or transferred within the first connection. That is, some attributes, such as port numbers, of the other connection are negotiated within the first connection. These are herein referred to as a control connection (the first connection) and a related connection (the other connection). In FTP, the related connection is often called data connection. Such a related connection is always related to some control connection and does not exist alone in a sense that opening the related connection requires intervention of the control connection. In addition, one related connection may be a control connection of another related connection. This concerns for example H.323 protocol. In these protocols, the attributes of related connections usually change dynamically. For example it is usually not known beforehand to which port a related connection will be established. Also the direction in which a related connection is opened may vary.

A firewall is traditionally considered as a set of components forming a gateway between two or more networks, which have different security requirements. Thus, a firewall is a gateway which operates at the same time as a connector and a separator between the networks in a sense that the firewall keeps track of the traffic that passes through it from one network to another and restricts connections and packets that are defined as unwanted by the administrator of the system. A firewall can be also so called personal firewall, which sits in an individual device, which needs to be protected, and monitors only connections going in to or coming out from that device. The operation of such personal firewall is in principle similar to the operation of a gateway firewall.

A firewall is configured by means of rules, which define which data packets are allowed to traverse the firewall and which are not. A rule comprises information for identifying a data packet (e.g. source and destination addresses and ports) and an associated action, which may be for example to allow or deny the packet. A firewall may be a simple packet filter, which compares header fields of a data packet to the firewall rules and processes the data packet according to the rule, which matches the data packet. A more advanced, stateful, firewall keeps track also on the state of different connections.

In a stateful firewall for example an FTP data connection is allowed only if negotiation of such data connection is noticed within a legitimate control connection. Other protocols comprising of more than one connection are treated similarly to FTP connections in stateful firewalls.

The use of protocols, which open related connections, creates vulnerability in a device, which is running applets, irrespective of whether a firewall is protecting the device or not. Let consider following scenario for illustrating this:

A Java applet is delivered to a client browser,

The Java applet acts as an FTP client and opens a control connection to the server, A data connection from the server to the client is negotiated for a port in which some other vulnerable service is running (previous experimentation or even an educated guess can be used for finding out such port), for an outside process, the data connection seems perfectly legitimate, since it was negotiated within a legitimate control connection, and thus it is allowed to traverse any firewall, either gateway or personal.

Thus the server is allowed to open a connection to a port, where a vulnerable service is running. In some cases connections to ports below 1024 are denied in a firewall, but plenty of vulnerable services can be found also in ports above 1024.

One solution for tackling this vulnerability is to block all related connections. The disadvantage of this solution is that it blocks also all legitimate use of some important protocols. In many cases this is not a viable solution. In case of FTP blocking active FTP would help, but then not even legitimate active FTP connections would be allowed and still related connections associated with other protocols could be exploited. (FTP connections are classified into passive and active; in passive FTP the data connection is opened to the same direction with the control connection and in active FTP the data connection is opened to the opposite direction with the control connection.) Another partial solution would be to monitor related connections and allow them only if data is going only in one direction. This would make malicious use of FTP more complex, since in legitimate FTP data connections data is going only in one direction, but it would not help in relation to protocols in which data is transferred bi-directionally in the related connections. And even FTP attacks would not be disabled by this solution, since past experience has proven that it is possible to craft an attack, which transmits data only to the target and does not require any return traffic.

Thus, a new solution for tackling this problem is needed.

SUMMARY OF THE INVENTION

An object of the invention is to provide a new solution for securing a device having data communication capability and to mitigate the vulnerability discussed above.

This object of the invention is achieved according to the invention as disclosed in the attached independent claims.

Preferred embodiments of the invention are disclosed in the dependent claims. The features described in one dependent claim may be further combined with features described in another dependent claim to produce further embodiments of the invention.

Malicious related connections are detected and blocked by examining relationship between a port negotiated for a related connection and the associated control connection and by deciding on the basis on this relationship, whether the related connection shall be allowed. This relationship may concern for example time elapsed between noticing negotiation of the related connection and opening the associated port. Alternatively the relationship may concern the process, which initiated the control connection, and the process, which opened the port. Also other determinants of the relationship may be used according to the invention. Viable determinants may be such that they indicate reasonably reliably legitimate use of related connections. In this way, opening a malicious related connection to a port, which is used e.g. by some vulnerable service, is prevented in most cases.

According to the invention the method of securing a device having data communication capability comprises
dynamically detecting a control connection, which originates from said device,
noticing negotiation of a related connection within said control connection, said negotiation comprising at least defining a port of the device for said related connection,
checking if relationship between said port of the device and the control connection fulfills predefined criteria, and
conditionally blocking said related connection, if said port of the device does not fulfill said predefined criteria.

According to an embodiment of the invention said predefined criteria requires that said port of the device is opened within a predefined time window in relation to noticing negotiation of a related connection within said control connection.

According to another embodiment of the invention said predefined criteria requires that said control connection and said port of the device are opened by the same process family.

The advantage of the invention is that it substantially decreases the vulnerability related to applets discussed above.

BRIEF DESCRIPTION OF THE DRAWINGS

Various features of the invention, as well as the advantages offered thereby, are described hereinafter in more detail with reference to embodiments and aspect of the invention illustrated in the accompanying drawings, in which.

PREFERRED EMBODIMENTS OF THE INVENTION

Figure 1:
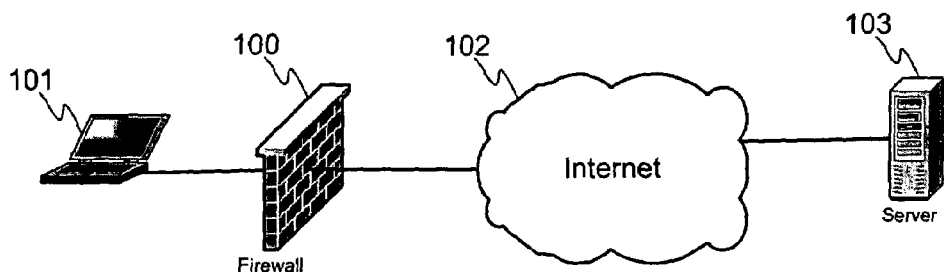
FIG. 1 illustrates an example network configuration.

FIG. 1 illustrates a simplified example network scenario, wherein the invention may be used. Therein a client device 101 is connected to the Internet 102 via a gateway firewall 100. The client device comprises some security measure, which is used for monitoring data going in to and out from the device and which implements functionality of the invention. Such security measure may be for example a personal firewall. A server 103, which provides www-services, is also connected to the Internet 102. The client device 101 may now connect to the server 103 via the gateway firewall 100 and request for a www-page containing an applet. The applet is conveyed to the client device 101 along with the requested www-page, and the applet is automatically run in the client device. (That is, if applets are allowed in the client device.) The applet may open a new connection to the server without security measures intervening in that. Also legitimate related connections can be opened to or from the client device. The gateway firewall 100 does not have means to detect a difference between a malicious related connection and a legitimate one, if there is an associated control connection, which seems to be legitimate. The only way to block malicious related connections in a gateway firewall or in a traditional personal firewall would be to block all related connections towards the client device 101. But the functionality of the invention included in the client device 101 prevents opening malicious or suspicious related connections to the client and at the same time allows legitimate related connections to the client.

The invention can be employed in any device, which needs to be protected from malicious use of related connections. Physically the device is a computer hardware device combined with appropriate software to do the tasks assigned to it. Examples of such devices are desktop and laptop computers, PDAs (Personal Digital Assistant), mobile phones and smart phones.

"The embodiments of the invention can be implemented using different mechanisms known by the one skilled in art, for example, a computer readable storage medium, known as part of a computer hardware".

One logical place, where to implement the invention, is a personal firewall program, which is running in the client device and which monitors traffic from and towards the client. As personal firewall sits in the device, which needs to be protected, it has access to additional client specific information in comparison to a gateway firewall. Therefore it is well suited for conducting functionality of the invention. However, the invention can be included also in some other application or equally it can be implemented on its own.

Figure 2A:
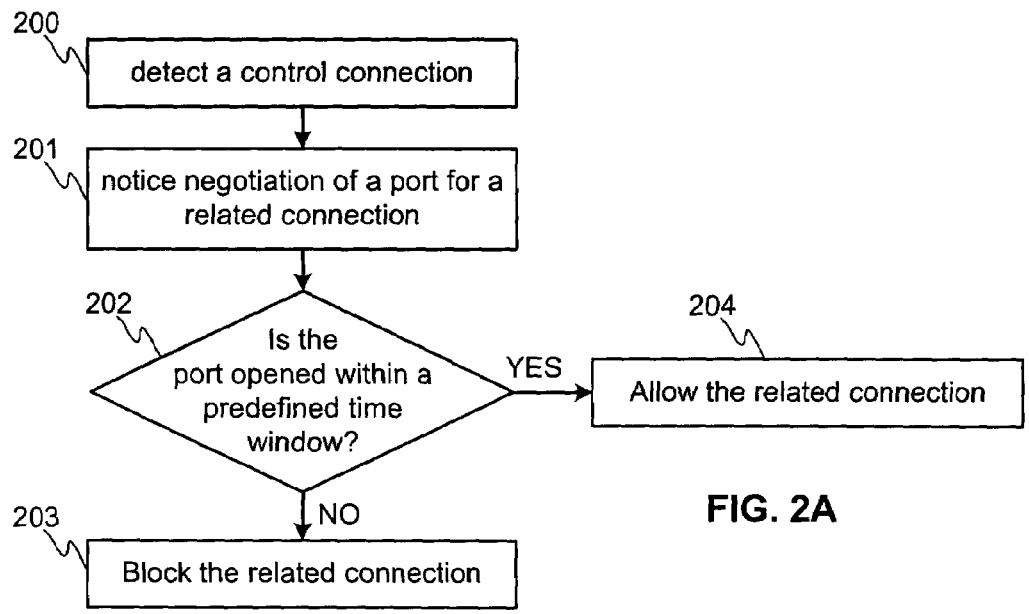
FIG. 2A is a flow chart illustrating an example of the method of the invention.

FIG. 2A is a flow chart illustrating an example of the method of the invention. In step 200, a control connection originating from the client device, in which the method of the invention is used, is detected. Then in step 201, it is noticed that a related connection is negotiated within that control connection. As described above, negotiating a related connection comprises defining one of the ports of the client device for the related connection. In step 202, the relationship between the port negotiated for the related connection and the control connection is examined by checking, if the port was opened within a predefined time window in relation to noticing negotiation of the related connection. There are no restrictions for the duration of the time window, but a suitable value can be for example between 10 and 1000 seconds. If the port was opened within the time window, the related connection is allowed in step 204 and in the opposite case the related connection is blocked in step 203. This implementation clearly requires that for each open port of the device the moment of time when the port was opened needs to be recorded. This is straightforward implementation detail for a man skilled in the art and thus not discussed any further herein.

Figure 2B:
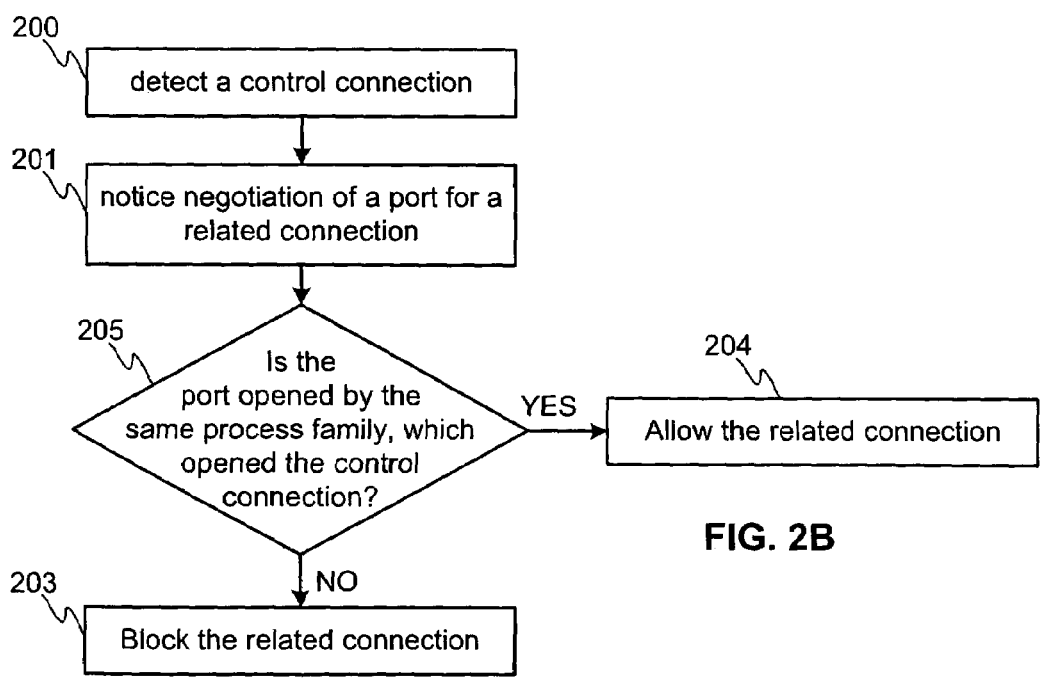
FIG. 2B is a flow chart illustrating another example of the method of the invention.

FIG. 2B is a flow chart illustrating another example of the method of the invention. Steps 200 and 201 are herein equal to respective steps in FIG. 2A. But now the relationship between the port negotiated for the related connection and the control connection is examined by checking, if the same process family, which had opened the control connection, opened the port. In its simplest form process family may refer to only one process. In that case the method of the invention would simply check if the same process opened the control connection and the port. Another definition for a process family is that processes belong to the same family, if they have common parent process from which they are inherited. In that case the method of the invention would check if the process, which opened the control connection, and the process, which opened the port, have a common parent process. Still other possibility is that the method of the invention would check if the process, which opened the control connection, is a parent process for the process, which opened the port. Also some other relationship between processes may be regarded as an indicator of processes belonging to the same process family. Comparisons of the processes can be done e.g. by means of process ID (PID) values and parent process ID values (PPID). If the same process family opened the port, the related connection is allowed in step 204 and in the opposite case the related connection is blocked in step 203.

It needs to be understood that the network configuration of FIG. 1 and the usage scenarios of the invention described above are only examples, and that the invention can be employed in various other ways within the scope of the invention.

The invention claimed is:

1. A method of securing a device having data communication capability, comprising dynamically detecting a control connection, which originates from said device, noticing negotiation of a related connection within said control connection, said negotiation comprising at least defining a port of the device for said related connection, checking if relationship between said port of the device and the control connection fulfills predefined criteria, and conditionally blocking said related connection, if said port of the device does not fulfill said predefined criteria, wherein said predefined criteria requires that said port of the device is opened within a predefined time window in relation to noticing negotiation of a related connection within said control connection, and wherein said predefined criteria requires that said control connection and said port of the device are opened by the same process family.

2. A method according to claim 1, wherein said device is running an applet.

3. A method according to claim 2, wherein said control connection originates from the applet.

4. A device having data communication capability and comprising a module, which is configured to dynamically detect a control connection, which originates from said device, notice negotiation of a related connection within said control connection, said negotiation comprising at least defining a port of the device for said related connection, check if relationship between said port of the device and the control connection fulfills predefined criteria, and conditionally block said related connection, if said port of the device does not fulfill said predefined criteria, wherein said predefined criteria requires that said port of the device is opened within a predefined time window in relation to noticing negotiation of a related connection within said control connection, and wherein said predefined criteria requires that said control connection and said port of the device are opened by the same process family.

5. A device according to claim 4, wherein said device is running an applet.

6. A computer readable storage medium comprising a computer program that carries out steps procedure which comprises dynamically detecting a control connection, which originates from said device, noticing negotiation of a related connection within said control connection, said negotiation comprising at least defining a port of the device for said related connection, checking if relationship between said port of the device and the control connection fulfills predefined criteria, and conditionally blocking said related connection, if said port of the device does not fulfill said predefined criteria, wherein said predefined criteria requires that said port of the device is opened within a predefined time window in relation to noticing negotiation of a related connection within said control connection, and wherein said predefined criteria requires that said control connection and said port of the device are opened by the same process family.

7. A computer readable storage medium according to claim 6, wherein said device is running an applet.

8. A computer readable storage medium according to claim 6, wherein said control connection originates from the applet.

9. A computer readable storage medium, comprising a computer program that carries out a personal firewall process which further includes dynamically detecting a control connection, which originates from said device, noticing negotiation of a related connection within said control connection, said negotiation comprising at least defining a port of the device for said related connection, checking if relationship between said port of the device and the control connection fulfills predefined criteria, and conditionally blocking said related connection, if said port of the device does not fulfill said predefined criteria, wherein said predefined criteria requires that said port of the device is opened within a predefined time window in relation to noticing negotiation of a related connection within said control connection, and wherein said predefined criteria requires that said control connection and said port of the device are opened by the same process family.

10. A device having data communication capability and comprising a first detector dynamically detecting a control connection, which originates from said device, a second detector detecting a negotiation of a related connection within said control connection, said negotiation comprising at least defining a port of the device for said related connection, a controller checking if relationship between said port of the device and the control connection fulfills predefined criteria, and said controller conditionally blocking said related connection, if said port of the device does not fulfill said predefined criteria, wherein said predefined criteria requires that said port of the device is opened within a predefined time window in relation to noticing negotiation of a related connection within said control connection, and wherein said predefined criteria requires that said control connection and said port of the device are opened by the same process family.

11. A device according to claim 10, wherein said device is running an applet.

* * * * *

UNITED STATES PATENT AND TRADEMARK OFFICE
CERTIFICATE OF CORRECTION

| | |
|---|---|
| PATENT NO. | : 7,401,353 B2 |
| APPLICATION NO. | : 10/689549 |
| DATED | : July 15, 2008 |
| INVENTOR(S) | : Joona Airamo |

It is certified that error appears in the above-identified patent and that said Letters Patent is hereby corrected as shown below:

Title page, item [73] Assignee: should read as follows: Stonesoft Corporation

Signed and Sealed this

Fourth Day of November, 2008

JON W. DUDAS
*Director of the United States Patent and Trademark Office*